United States Patent
El Ayoubi

(10) Patent No.: US 10,390,300 B2
(45) Date of Patent: Aug. 20, 2019

(54) METHOD FOR WAKING UP A BASE STATION SERVING A SMALL CELL WHEN AN INCOMING CALL ARRIVES

(71) Applicant: ORANGE, Paris (FR)

(72) Inventor: Salah Eddine El Ayoubi, Le Kremlin Bicetre (FR)

(73) Assignee: ORANGE, Paris (FR)

( * ) Notice: Subject to any disclaimer, the term of this patent is extended or adjusted under 35 U.S.C. 154(b) by 34 days.

(21) Appl. No.: 14/651,108

(22) PCT Filed: Dec. 18, 2013

(86) PCT No.: PCT/FR2013/053150
§ 371 (c)(1),
(2) Date: Jun. 10, 2015

(87) PCT Pub. No.: WO2014/096692
PCT Pub. Date: Jun. 26, 2014

(65) Prior Publication Data
US 2015/0334649 A1    Nov. 19, 2015

(30) Foreign Application Priority Data

Dec. 21, 2012 (FR) .................... 12 62688

(51) Int. Cl.
*H04W 52/02* (2009.01)
*H04W 84/10* (2009.01)

(52) U.S. Cl.
CPC ........ *H04W 52/0206* (2013.01); *H04W 84/10* (2013.01); *Y02D 70/1224* (2018.01);
(Continued)

(58) Field of Classification Search
CPC .......... H04W 52/0206; H04W 84/045; H04W 84/10; H04W 84/105; H04W 84/12; Y02B 60/50
(Continued)

(56) References Cited

U.S. PATENT DOCUMENTS

| 2011/0244870 A1* | 10/2011 | Lee | ..................... H04W 52/244 455/444 |
| 2012/0015657 A1* | 1/2012 | Comsa | ............. H04W 36/0094 455/436 |

(Continued)

OTHER PUBLICATIONS

Soumya Das et al., "Active Call Macro-Femtocell Hand-in Enhancement", 3GPP2 Draft: a20-20100719-001RO Active Call Macro-Femtocell Hand-In Enhancement, Jul. 20, 2010, pp. 1-13, XP062113330.
(Continued)

*Primary Examiner* — Erica Navar
(74) *Attorney, Agent, or Firm* — Haverstock & Owens LLP

(57) ABSTRACT

The invention relates to a method of waking up a base station of a cellular network, the method comprising the following steps:
putting said base station partially on standby; and
an access point of a local wireless network detecting the presence of a terminal in its coverage zone, and identifying said terminal.
Said method further comprising the following steps:
said access point transmitting a message indicating the presence of the terminal, said message containing an identifier of the terminal;
the base station receiving said message;
the base station transmitting to said cellular network information that said terminal is situated in its coverage zone; and
(Continued)

the base station waking up when it receives a communication for the terminal from the cellular network.

Application to heterogeneous mobile networks.

5 Claims, 1 Drawing Sheet

(52) U.S. Cl.
CPC ...... *Y02D 70/1226* (2018.01); *Y02D 70/1242* (2018.01); *Y02D 70/1262* (2018.01); *Y02D 70/142* (2018.01); *Y02D 70/144* (2018.01); *Y02D 70/162* (2018.01); *Y02D 70/164* (2018.01)

(58) Field of Classification Search
USPC ............... 455/422.1, 127.5; 370/328, 331
See application file for complete search history.

(56) References Cited

U.S. PATENT DOCUMENTS

| | | | | |
|---|---|---|---|---|
| 2012/0106423 | A1* | 5/2012 | Nylander | H04W 52/0241 370/311 |
| 2014/0295905 | A1* | 10/2014 | Koskinen | H04W 52/0206 455/522 |

OTHER PUBLICATIONS

Soumya Das et al., "A25 Active Call (Macro to Femtocell) Hand-in Enhancement", Nov. 2, 2010, pp. 1-10, XP062113676.

Ashraf I et al., "Power savings in small cell deployments via sleep mode techniques", 2010 IEEE 21st International Symposium on personal, Indoor and Mobile Radio Communications Workshops, Sep. 26, 2010, pp. 307-311, XP031837067, ISBN: 978-1-4244-9117-9.

Holger Claussen et al., "Dynamic Idle Mode Procedures for Femtocells", Bell Labs Technical Journal 15(2), pp. 95-116 (2010), Alcatel-Lucent, DOI: 10.1002/bltj.20443.

* cited by examiner

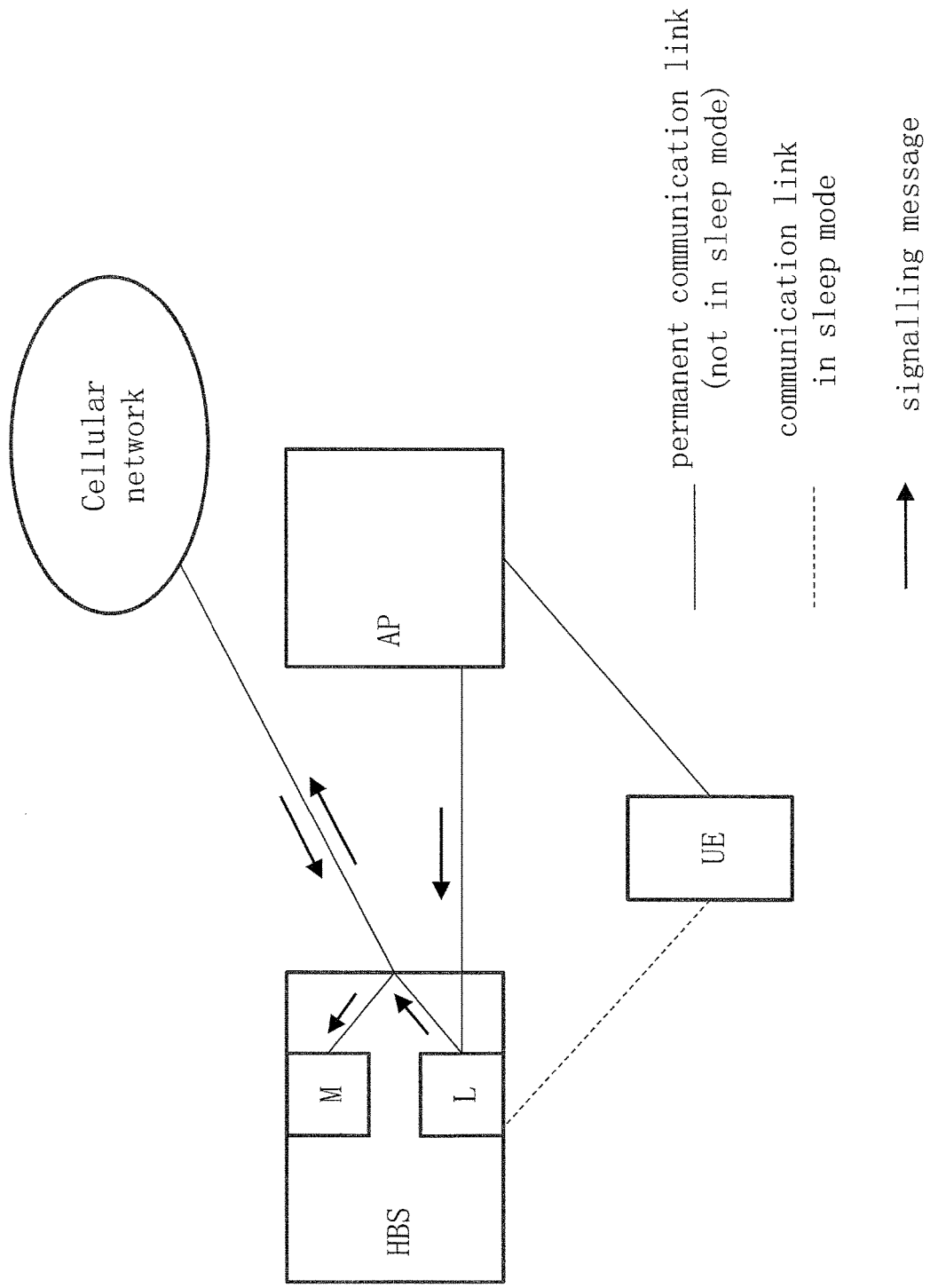

METHOD FOR WAKING UP A BASE STATION SERVING A SMALL CELL WHEN AN INCOMING CALL ARRIVES

The invention relates to the field of telecommunications. It relates in particular to base stations (referred to as "small" stations in the present invention) that serve respective cells of "small" size and that process a fraction of the communications traffic in such a manner as to be able to off-load a radio station serving a cell of "large" size (referred to as a "macro" cell) in the event of high levels of traffic, so as to reduce the congestion of the communications traffic in the macro cell. More particularly, the invention relates to reducing the energy consumption of such "small" stations.

BRIEF DESCRIPTION OF THE DRAWINGS

FIG. 1 illustrates a diagram of a Home Base Station (HBS) communicating with a cellular network, an Access Point (AP) and a User device (UE) according to some embodiments.

In order to increase the capacity of cellular mobile networks and in order to off-load macro base stations, operators make use of cells that are relatively small or very small in size, in addition to "macro" cells of conventional size. The term "microcell" is generally used for a cell covering a zone having a radius of less than 500 meters (m), the term "picocell" is used for a cell covering a zone of approximately 200×200 square meters (m²), and the term "femtocell" for a cell covering a zone of approximately 10×10 m². The coverage zone of each station can be limited by controlling its power.

Operators are thus considering the deployment of so-called "heterogeneous" networks that comprise simultaneously macro cells and small cells managed by the same operator. On arriving in the network, mobile terminals generally attach themselves to the base station from which they are receiving the strongest pilot signal; they therefore attach themselves to a local small cell rather than to the macro network if the pilot power received from the local station is greater than that received from the macro station. Such heterogeneous networks enable a small station to off-load a neighboring macro station by absorbing a fraction of the traffic of the macro station.

It is also possible to envisage making up a network using small cells only (without macro cells), but such a network would have difficulty in ensuring complete coverage for the territory in question.

Flexibility in terms of cell size is a characteristic of second generation (2G) mobile technology and of subsequent technologies, and it represents a significant factor in enabling the capacity of networks to be increased. Controlling the power used in mobile networks makes it easier to reduce interference between neighboring cells using the same frequencies. By subdividing cells and by creating more cells (referred to as network "densification") in order to serve high density zones, a cellular network operator can optimize spectrum utilization and can make it possible for capacity to increase.

It is thus possible to use a base station of relatively low power to cover a limited zone. This makes it possible to increase the capacity of the network in zones where access is difficult or expensive in the conventional "macro-cellular" approach.

More precisely, a "microcell" may cover a zone such as a commercial center, a hotel, or a transport center. Microcells are often deployed temporarily during sporting events or on other occasions when it is known in advance that there will be a need for additional capacity at a specific location.

A "picocell" generally covers a zone of small size, e.g. inside a building (offices, commercial centers), or, more recently, inside an airplane. Picocells are generally used to extend coverage to indoor zones, i.e. where outdoor signals do not penetrate well, or in order to increase the capacity of the network in zones having high density of telephone utilization, as in train stations. A picocell base station is generally a relatively simple unit of low cost and of small size. Picocells are to be found using most cellular technologies such as the global system for mobile communications with general packet radio service (GSM/GPRS), universal mobile telecommunications system (UMTS), and long term evolution (LTE).

In GMS/GPRS networks in particular, each picocell base station is connected to a base station controller (BSC). Numerous picocells are connected to each BSC. The BSC manages radio resources and so-called "handover" functions (i.e. enabling a mobile terminal to migrate from a cell to a neighboring cell), and it aggregates data for transmission purposes to a mobile-switching center (MSC) and/or a gateway GPRS support node (GGSN). Connectivity between picocell units and the BSC is generally provided by cabling inside a building; more recent systems use Ethernet cabling; airplanes use satellite links.

UMTS networks may comprise private networks (e.g. home networks) constituted by small-sized cells known as "femto NodeBs", in which the base stations, known as "Home NodeBs" (HNB) combine the functions of a NodeB and of a radio network controller (RNC). Each HNB is connected to an HNB gateway situated outside the private network in the radio access network of the operator; the HNB gateway manages the HNB and subscriber traffic, and acts as an intermediary with the core network. It should be observed that GSM networks also have HNB gateways performing analogous functions.

The invention applies to the architectures described briefly above and in particular to "femto 3G" architectures as defined in the document TR 25.820 V8.2.0 (2008-09) published by the third-generation partnership project (3GPP), and also to future "femto LTE" architectures. These architectures use "femtocells" in which it is possible to deploy a home mobile network at low cost using the broadband infrastructure already present on subscriber premises. This context is of very great interest for operators: it is expected that a significant proportion of subscribers to future telephone packages will have their own femtocells.

Nevertheless, small stations increase the energy consumption of the access network since they are active continuously in order to perform their services. Proposals have thus been made to put a small station on standby when it has not been used for communication purposes for a certain length of time, in order to reduce its consumption.

The main problem caused by such a provision is that of waking up the small station while it is on standby and a request for communication is addressed to it. By way of example, this happens when the cellular core network seeks to transmit a call to a terminal suitable for connecting to some particular small station, but there is no macro coverage in the zone where the small station is located (i.e. in a homogeneous network, or even in a heterogeneous network as a result of local circumstances): specifically, in such a situation, the core network cannot locate the terminal on the basis of the underlying radio technology and therefore cannot know the base station (small or macro) to which it needs to direct the call; in order to remedy that problem, it is possible to envisage fitting the terminal with some kind of locating tool (e.g. using global positioning system (GPS) technology), however known locating methods are generally of poor reliability inside buildings.

The article by H. Claussen, I. Ashraf, and L. T. W. Ho entitled "Dynamic idle mode procedures for femtocells" (IEEE WCNC, Sydney, April 2010) discloses a method of waking up a femtocell by using an additional link constituted by a low power radio signal: for example, using this radio signal, a user can wake up a femto station on standby when the user is ready to receive communications coming from the core network. That procedure manifestly has the drawback that the femto station is activated for the period until the equipment is put back on standby, even in the event of no communication arriving. Furthermore, it requires a dedicated radio receiver to be added to the femto stations that are to implement the method, and it also requires a dedicated radio transmitter to be added to all of the terminals that are to perform the method.

The present invention thus provides a method of waking up a base station of a cellular network, the method comprising the following steps:
    putting said base station partially on standby; and
    an access point of a local wireless network detecting the presence of a terminal in its coverage zone, and identifying said terminal.
Said method is remarkable in that it further comprises the following steps:
    said access point transmitting a message indicating the presence of the terminal, said message containing an identifier of the terminal;
    the base station receiving said message;
    the base station transmitting to said cellular network information that said terminal is situated in its coverage zone; and
    the base station waking up when it receives a communication for the terminal from the cellular network.

It should be observed that in the context of the present invention, the term "terminal" designates any portable article suitable for participating in wireless communications. By way of example, the terminal may be a mobile telephone, or a laptop computer, or indeed a digital tablet.

The invention thus enables a base station of a cellular network to be woken up when there arrives an incoming call for a terminal that possesses a first interface for connection with said cellular network and a second interface for connection with a local wireless network.

By means of these provisions, it is possible to reduce the consumption of base stations, since they are woken up only when incoming calls are actually received.

It should be observed that the present invention advantageously operates with conventional terminals, unlike the method of the article by H. Claussen et al., as described briefly above.

The invention does not prejudice the means that might be used for outgoing calls. By way of example, provision may be made for the user of the terminal to wake up the base station manually when seeking to place a call via the base station. When said cellular network is a heterogeneous network, provision may also be made for the terminals to use the macro network for their outgoing calls.

Correspondingly, the invention relates to a base station of a cellular network, the base station having first means for putting itself partially on standby when it has been inactive for a certain length of time. Said base station is remarkable in that it also has second means that are not put on standby with the remainder of the base station, said second means comprising:
    a locating agent suitable both for receiving a message indicating the presence of a terminal, said message containing an identifier of the terminal, and for transmitting to said cellular network information that said terminal is situated in its coverage zone; and
    a wakeup agent suitable for waking up the base station when it receives a communication for the terminal from the cellular network.

The invention also relates to a telecommunications system comprising:
    at least one base station as described briefly above; and
    at least one access point of a local wireless network, said access point comprising means for:
        detecting the presence of a user terminal in the coverage zone of the access point and for identifying said terminal; and
        sending a message indicating the presence of the terminal, said message containing an identifier of the terminal.

The advantages offered by the base station and the telecommunications system are essentially the same as those offered by said method.

It should be observed that said base station and said access point may be grouped together in a single piece of equipment, or they may constitute distinct pieces of equipment, or they may be grouped together in a network (a network having a plurality of base stations and/or a network having a plurality of access points).

The invention also relates to a computer program downloadable from a communication network and/or stored on a computer readable medium and/or executable by a microprocessor. The computer program is remarkable in that it includes instructions for executing the steps of a base station wakeup method as described briefly above, when the program is executed by a computer.

The advantages offered by the computer program are essentially the same as those offered by said method.

Other aspects and advantages of the invention appear on reading the following detailed description of particular implementations given as non-limiting examples.

To begin with, it should be observed that the present invention is compatible with all known radio multiple access technologies (using time division, code division, wideband code division, orthogonal frequency division (TDMA, CDMA, W-CDMA, OFDMA, etc.). It applies in particular to cellular networks using GSM/GPRS technology, as defined in the 97 and subsequent versions of the GSM standard, or the UMTS technology as defined in particular in the standards 23.002, 23.003, and 29.060 of the 3GPP, or indeed the LTE standard.

It should be recalled that whereas GMS uses a circuit-switched data transmission medium, GPRS adds thereto an additional data transmission medium that is packet-switched, thus enabling a mobile station to be provided with Internet protocol (IP) connectivity that is continuously available, but in which radio resources are allocated only when data needs to be transferred. Subscribers to a mobile operator can thus access services using the IP protocol, such as electronic messaging, file downloading, consulting Web sites, or WAP (Wireless Application Protocol).

UMTS uses circuit-switching and packet-switching. UMTS uses W-CDMA technology as standardized by the 3GPP, and constitutes a European implementation of the IMT-2000 specifications of the International Telecommunication Union (ITU) for third generation (3G) cellular radio systems. UMTS enables data contained in IP packets to be exchanged with servers belonging to a network outside the UMTS network, such as the Internet network.

The LTE forms part of the UMTS standard, but includes numerous modifications and improvements, and in particular the use of orthogonal frequency division multiple access (OFDMA) for the down link and single-carrier frequency division multiple access (SC-FDMA) for the up link (instead of W-CDMA for UMTS). LTE requires dedicated radio coverage that is distinct from UMTS coverage.

The communications system of the invention is placed in a zone that is covered firstly by one or more base stations referred to as home base station (HBS) of a cellular network, each managing a cell of the 3G femtocell type, for example, and secondly by one or more access points (AP) of a local wireless network, e.g. a radio network of the WiFi or ZigBee type, or indeed an infrared network. A plurality of terminals (mobile telephones, tablets, computers, etc.) use the local network, and some of them can also use the 3G femto network.

FIG. 1 illustrates a diagram of an HBS communicating with a cellular network, an AP and a user device according to some embodiments.

There follows a description in an implementation of the invention of a method for waking up a base station that makes use of a user terminal possessing both a WiFi interface and a 3G interface.

During a step E0, the HBS is put partially on standby in conventional manner when it has not needed to manage any 3G communication for a predetermined duration.

During a step E1, when a terminal having its WiFi active enters into the coverage zone of the AP, it is automatically detected and identified by the AP in conventional manner.

During a step E2, a transmitter agent Z contained in the AP transmits a message to the HBS indicating that the terminal is present and containing an identifier for the terminal. This message may be sent in any manner, depending on the preferences of the person skilled in the art. Thus, the message may be conveyed between the AP and the HBS over a wireless link (infrared, Bluetooth, etc.), however it is preferably conveyed over a wired link, which is less expensive in energy terms. Furthermore, it may comply with a format that is specific to the interface between the AP and the HBS, or with a conventional format such as extensible markup language (XML).

During a step E3, a receiver agent K that is associated with the HBS and that is not put on standby when the HBS is put on standby receives the message and transmits it to a locating agent L of the HBS, which locating agent likewise is not put on standby when the HBS is put on standby.

During a step E4, said locating agent L acts via the direct link from the HBS to the mobile core network or to the fixed network (known as the "backhaul" link) to inform the cellular network of the presence of the terminal in the coverage zone of the HBS. The network of the operator then locates the terminal as being associated with that particular HBS and configures the network in such a manner as to direct calls for that terminal to that HBS.

When an incoming call arrives at the HBS via its backhaul link, in a step E5, a wakeup agent M of the HBS, which likewise was not put on standby during step E0, wakes up the HBS.

The HBS can then use conventional procedures to trigger a procedure for attachment with the terminal and can then pass it the call.

Optionally, provision may also be made for the steps of the invention to be performed only after the AP has verified that the terminal that has been detected as being present is in fact suitable for connecting with the HBS. It can happen that certain terminals capable of accessing the AP are not authorized to access the HBS situated nearby: for example, in a heterogeneous cellular network, a visitor may be authorized to use the local wireless network but not the cellular network, with access to small cells being subjected to the same rules as access to the macro network.

It should be observed that the receiver agent K, the locating agent L, and the wakeup agent M may be implemented within modules that are physically distinct; in a variant, two of them or all three of them may be implemented within a common module.

It should also be observed that implementation of the invention within an access point of a local wireless network or within a base station of a cellular network may be performed using software components and/or hardware components.

The software components may be incorporated in a conventional computer program for managing a network node. That is why, as mentioned above, the present invention also relates to a computer system. The computer system comprises in conventional manner a central processor unit using signals to control a memory, and also an input unit and an output unit.

Furthermore, the computer system may be used to execute a computer program including instructions for performing the method of the invention for waking up a base station.

Specifically, the invention also provides a computer program that is downloadable from a communications network and comprising instructions for executing steps of a method of the invention for waking up a base station when it is executed on a computer. The computer program may be stored in a computer readable medium and may be suitable for execution by a microprocessor.

The program may use any programming language, and it may be in the form of source code, object code, or code intermediate between source code and object code, in a partially compiled form, or in any other desirable form.

The invention also provides a computer readable data medium that is not removable, or that is partially or totally removable, and that includes instructions of a computer program as mentioned above.

The data medium may be any entity or device capable of storing the program. For example, the medium may comprise storage means such as a read only memory (ROM), e.g. a compact disk (CD) ROM, or a microelectronic circuit ROM, or indeed magnetic recording means such as a hard disk, or indeed a universal serial bus (USB) flash drive.

Furthermore, the data medium may be a transmissible medium such as an electrical or optical signal, suitable for being conveyed via an electrical or optical cable, by radio, or by other means. The computer program of the invention may in particular be downloaded from a network of the Internet type.

In a variant, the data medium may be an integrated circuit in which the computer program is incorporated, the circuit being adapted to execute or to be used in the execution of the method of the invention for waking up a base station.

The invention claimed is:

1. A method of waking up a base station of a cellular network, the method comprising the following steps:
putting said base station (HBS) of the cellular network partially on standby (E0); and an access point (AP) of a local non-cellular wireless network detecting (E1) presence of a terminal in a coverage zone of said access point, and identifying said terminal;

said access point (AP) transmitting (E2) outside of the local non-cellular wireless network to the base station (HBS) of the cellular network, a message indicating the presence of the terminal, said message containing an identifier of the terminal;

the base station (HBS) receiving (E3) said message;

the base station (HBS) transmitting (E4) to said cellular network information that said terminal is situated in a coverage zone of said base station; and the base station (HBS) waking up (E5) when said base station receives from the cellular network an incoming call intended for the terminal.

2. A base station of a cellular network, the base station comprising:

first means for putting said base station partially on standby when said base station has been inactive for a certain length of time; and second means that are not put on standby with the remainder of the base station (HBS), said second means comprising:

a locating agent (L) suitable both for receiving a message originating from outside the cellular network from an access point of a local non-cellular wireless network indicating presence of a terminal in a coverage zone of the access point, said message containing an identifier of the terminal, and for transmitting to said cellular network information that said terminal is situated in a coverage zone of said base station; and a wakeup agent (M) suitable for waking up the base station (HBS) when said base station receives from the cellular network an incoming call intended for the terminal.

3. A telecommunications system comprising:

at least one base station (HBS) according to claim 2; and at least one access point (AP) of a local non-cellular wireless network, said access point (AP) comprising means for:

detecting presence of a user terminal in a coverage zone of the access point (AP) and identifying said terminal; and sending a message indicating the presence of the terminal, said message containing said identifier of the terminal.

4. Data storage means that are not removable, or that are partially or totally removable, including computer program code instructions for executing steps of a base station wakeup method according to claim 1.

5. A telecommunications system comprising:

a base station of a cellular network, the base station having an energy saving module for putting the base station partially on standby when the base station has been inactive for a certain length of time, the base station (HBS) also having second means that are not put on standby with the remainder of the base station (HBS), the second means comprising:

a locating agent (L) suitable both for receiving a message originating from outside the cellular network indicating presence of a user terminal, the message containing an identifier of the user terminal, and for transmitting to the cellular network information that the user terminal is situated in a coverage zone of the base station; and a wakeup agent (M) suitable for waking up the base station (HBS) when the base station receives from the cellular network an incoming call intended for the user terminal; and an access point (AP) of a local non-cellular wireless network, the access point (AP) configured to:

detect presence of the user terminal in a coverage zone of the access point (AP) and identifying the user terminal; and sending a message outside of the local non-cellular wireless network to the locating agent (L) of the base station, the message comprising the identifier of the user terminal and indicating the presence of the user terminal.

* * * * *